(12) United States Patent  (10) Patent No.: US 8,261,462 B2
Coyle  (45) Date of Patent: Sep. 11, 2012

(54) PICTURE HANGING, POSITIONING AND LEVELING DEVICE

(76) Inventor: Timothy Lee Coyle, Mason, OH (US)

(*) Notice: Subject to any disclaimer, the term of this patent is extended or adjusted under 35 U.S.C. 154(b) by 189 days.

(21) Appl. No.: 12/823,121

(22) Filed: Jun. 24, 2010

(65) Prior Publication Data

US 2010/0325905 A1 Dec. 30, 2010

Related U.S. Application Data

(60) Provisional application No. 61/219,997, filed on Jun. 24, 2009.

(51) Int. Cl.
*B25H 7/04* (2006.01)
*G01B 5/00* (2006.01)

(52) U.S. Cl. ............... 33/613; 33/451; 33/669

(58) Field of Classification Search .............. 33/332, 33/371, 451, 520, 561.1, 561.2, 561.3, 613, 33/666, 669
See application file for complete search history.

(56) References Cited

U.S. PATENT DOCUMENTS

| | | | | |
|---|---|---|---|---|
| 1,210,370 A * | 12/1916 | Dvorak | ............................ | 33/341 |
| D136,978 S * | 1/1944 | Tomasini | ....................... | D10/71 |
| 3,861,049 A * | 1/1975 | Muller | ............................. | 33/562 |
| 4,485,561 A * | 12/1984 | Hopkins, Sr. | ................... | 33/574 |
| 6,055,736 A * | 5/2000 | Gaston | ............................ | 33/528 |
| 6,473,983 B1 * | 11/2002 | Gier | ................................. | 33/613 |
| 6,785,977 B1 * | 9/2004 | Crichton | ......................... | 33/613 |
| 6,935,034 B2 * | 8/2005 | Malard et al. | ................... | 33/286 |
| 6,944,962 B2 * | 9/2005 | Tessel et al. | .................... | 33/414 |
| 7,155,840 B1 * | 1/2007 | Carbonaro | ...................... | 33/613 |
| 7,503,126 B2 * | 3/2009 | Robins | ............................ | 33/613 |
| 7,690,129 B2 * | 4/2010 | Bender | ........................... | 33/613 |
| 7,707,737 B2 * | 5/2010 | Lightfoot | ........................ | 33/700 |
| 7,814,675 B2 * | 10/2010 | Venderley et al. | ............... | 33/613 |
| 2007/0283588 A1 * | 12/2007 | Gardner et al. | ................. | 33/666 |
| 2009/0188121 A1 * | 7/2009 | Rabin | ............................. | 33/332 |

* cited by examiner

*Primary Examiner* — R. A. Smith

(57) ABSTRACT

The present invention relates to a picture hanging, positioning and leveling device for use in marking one or more points on a wall or other vertical surface where fastener devices should be installed in order to precisely hang one or more pictures or other objects at their desired locations on the wall. The device includes an elongate frame component which, in one embodiment, may be a carpenter's level-like apparatus, one or more first extension components extending up from the elongate frame and one or more second extension components extending out from the first extension component in a plane parallel with the face of the elongate frame. Each second extension component in configured to include at one end both a hook element for insertion into hanging elements on the back of the objects to be hung and a marking element for marking a point on the wall for the subsequent installation of a fastener device.

26 Claims, 9 Drawing Sheets

PICTURE HANGING, POSITIONING AND LEVELING DEVICE

CROSS REFERENCE TO RELATED APPLICATIONS

The present application is related to, and claims the priority of, U.S. Provisional Patent Application No. 61/219,997, filed Jun. 24, 2009, the entirety of which is incorporated herein by reference.

BACKGROUND

1. Field

The invention relates generally to a device for facilitating the hanging, positioning and leveling of one or more pictures or other objects on a wall or other vertical surface. In particular, the invention is a tool that enables persons desiring to hang pictures or other objects to quickly, easily and nearly simultaneously locate and mark on the selected surface the precise spot at which each of one or more nails, screws, hooks or other fastener devices must be installed in order to achieve the desired positioning and leveling of each of one or more such objects.

The desired hanging of a picture or other object requires the proper positioning of one or more nails, screws, hooks or other fastener devices on the wall or other vertical surface, each of which fastener devices will be inserted into or otherwise attached to a wire, saw-tooth bracket or other hanging element on the back of the picture or other object. This task becomes especially challenging when a variety of types of such fastener devices and hanging elements are present, and even more challenging when multiple objects are being hung and the positioning of each is dependent upon the positioning of each of the others.

The task of precisely locating the exact spot at which each of multiple nails, screws, hooks or other fastener devices is to be installed on a wall or other surface almost always requires some degree of trial and error. As a result, the positioning of one or more of the fastener devices frequently must be adjusted, thereby increasing the time required to complete the task and leaving a number of potentially visible misplaced holes in the wall.

2. Description of the Related Art

A number of devices have been developed in an attempt to facilitate the picture hanging process, thereby improving on the commonly used trial-and-error approach to precisely locating the spot or spots on the wall at which fastener devices are to be installed. Some of these devices are designed for use with only one type of hanging element, and others are designed for use with only one type of nail, screw, hook or other fastener device. Additionally, some of these devices are limited in that they are usable for locating the position for installing only a single fastener device. Others are limited in that they can be used for hanging only a single picture. In general, however, none of these other devices is adaptable for all of: easily marking the wall in a clear easy-to-see manner; hanging a picture that utilizes more than one fastener device and requires the use of more than one hanging element; hanging more than one picture; hanging a large and/or heavy object such as a mirror; hanging and leveling one or more pictures with more than one type of fastener device; and hanging more than one picture where at least one picture is to be positioned on an adjoining wall.

There exists, therefore, a need for further improvements in and to devices for facilitating the hanging of pictures on walls, particularly with respect to easily and nearly simultaneously locating the precise spots on such walls at which a plurality of fastener devices are to be installed in order to hang a plurality of pictures. The present invention fulfills these needs and provides further related advantages.

SUMMARY OF THE INVENTION

In accordance with the invention, a picture hanging, positioning and leveling tool is provided for facilitating the marking one or more points on a wall for subsequent installation of fasteners for use in hanging one or more pictures or other objects from the wall.

One embodiment of the invention comprises a first extension portion component and a second extension portion component wherein the first extension portion component is attached or attachable to an elongate frame. The elongate frame is adapted to be positioned in contact with a top surface of at least one picture to be hung.

In one embodiment of the invention, each first extension portion is adapted to rotate on its axis and to permit the second extension portion to be inserted through it on a plane parallel to the plane of the front face of the elongate frame. One end of each second extension portion is adapted to form both a hook element and a marking element. The device is placed on the floor with the front face of the elongate face facing away from the floor and one or more pictures to be hung are placed face down on the floor with their top edge abutted against the bottom edge of the elongate frame, with the distance between each picture being the same as the desired distance between them when hung on the wall. One first extension portion is positioned on the elongate frame at a position generally above each hanging element on the back of each picture and such that the hook element of its second extension portion component can be extended directly to a hanging element. Each hook element is then hooked into or over the corresponding hanging element and locked into place.

After all hook elements have been hooked into or over a hanging element and locked into place, each is then disengaged from the hanging element. The device is then removed from the floor and pictures, rotated end-over-end one hundred eighty degrees and then positioned in the desired position on the wall and leveled. Each marking element is then pressed against the wall leaving a mark or indentation precisely where a fastener device is to be subsequently installed.

Other features and advantages of the present invention will become apparent from the following more detailed description, taken in connection with the accompanying drawings with illustrate the components, methods and principals of the present invention.

BRIEF DESCRIPTION OF THE DRAWINGS

In order that the advantages of the invention will be readily understood, amore particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

It will be readily understood that the components of the embodiments, as generally described herein and illustrated in part in the accompanying drawings, may be arranged and designed in a wide variety of different configurations. Thus, the following more detailed description of the embodiments of the apparatus, system and method of the invention, as represented in part in the attached figures, is not intended to limit the scope of any or all embodiments, but is merely representative of selected embodiments.

The features, structures or characteristics of the invention described throughout this specification may be combined in any suitable manner in one or more embodiments. For example, reference throughout this specification to "certain embodiments," "an embodiment," "another embodiment" or similar language means that a particular feature, structure or characteristic described in connection with the embodiment is included in at least one embodiment of the present invention. Thus, appearances of the phrases "in certain embodiments." "in an embodiment," "in another embodiment" or similar language throughout this specification do not necessarily all refer to the some group of embodiments and the described features, structures or characteristics may be combined in any suitable manner in one or more embodiments.

References throughout this specification to "picture" are intended to refer to any type of framed picture or other object desired to be hung on a wall or other surface. References throughout this specification to "wall" are intended to refer to any wall or other surface on which a picture is desired to be hung. References throughout this specification to "floor" are intended to refer to any floor or other horizontal surface. References throughout this specification to "hanging element" are intended to refer to any wire, saw-tooth bracket or other element on the back of a picture by which that picture is to be hung on a wall. References throughout this specification to "fastener device" are intended to refer to any nail, screw, hook or other fastener device to be installed on, inserted into or otherwise attached to a wall and from which a picture is to be hung by its hanging element.

Figure 1:
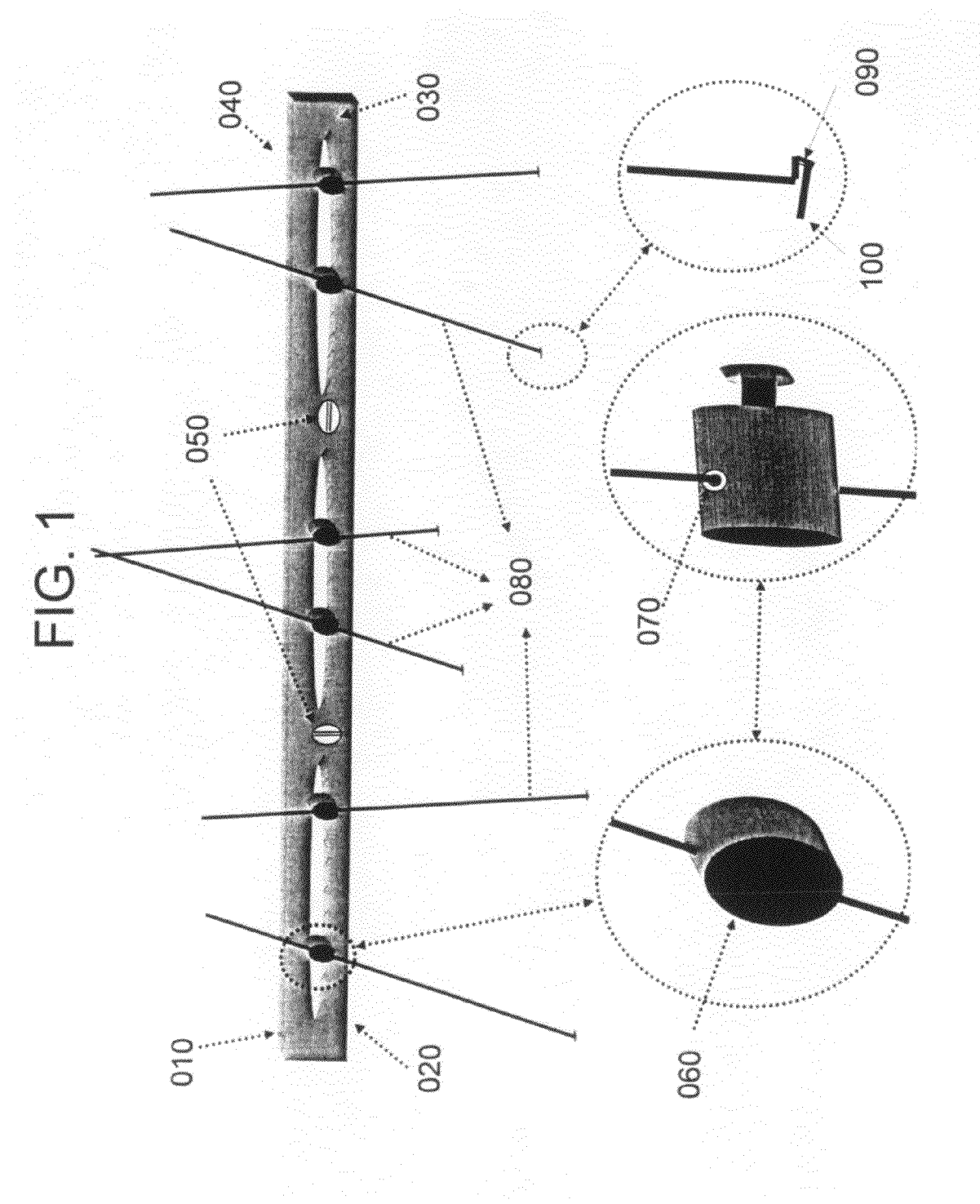
FIG. 1 is an illustration of one embodiment of the invention showing all the component parts, both assembled and, in part, as extracted drawings.

One embodiment of the invention consists of three main components, as illustrated in FIG. 1. The first component comprises an elongate frame 010 the preferred embodiment of which includes a long, straight bottom edge 020, a flat front face 030, a flat rear face 040 and one or more bubble-level elements 050. The second component comprises a preferably thimble-sized and cylindrical-shaped first extension portion 060 that in its preferred embodiment is rotatable on its axis. A plurality of the first extension portions are movably attached to the front face of the elongate frame component in a manner that allows each first extension portion to be moved some distance back and forth along the length of the elongate frame component and temporarily fixedly attached to the elongate frame at the desired location. In its preferred embodiment, the first extension portion has one or more holes 070 in its side that extend all the way through and out the other side and through each of which one of the third components is inserted. The third component is a wire or other long and straight element 080 that is sufficiently rigid so as to remain straight when extended to various lengths through the hole in the side of a first extension portion. One end of each second extension portion is crimped or otherwise configured to form a small hook element 090 with a marking element 100 directly opposite the hook element. One second extension portion is inserted through each hole in the side of each first extension portion, with the plane of each such second extension portion being approximately parallel to the plane of the front face of the elongate frame component.

Figure 2:
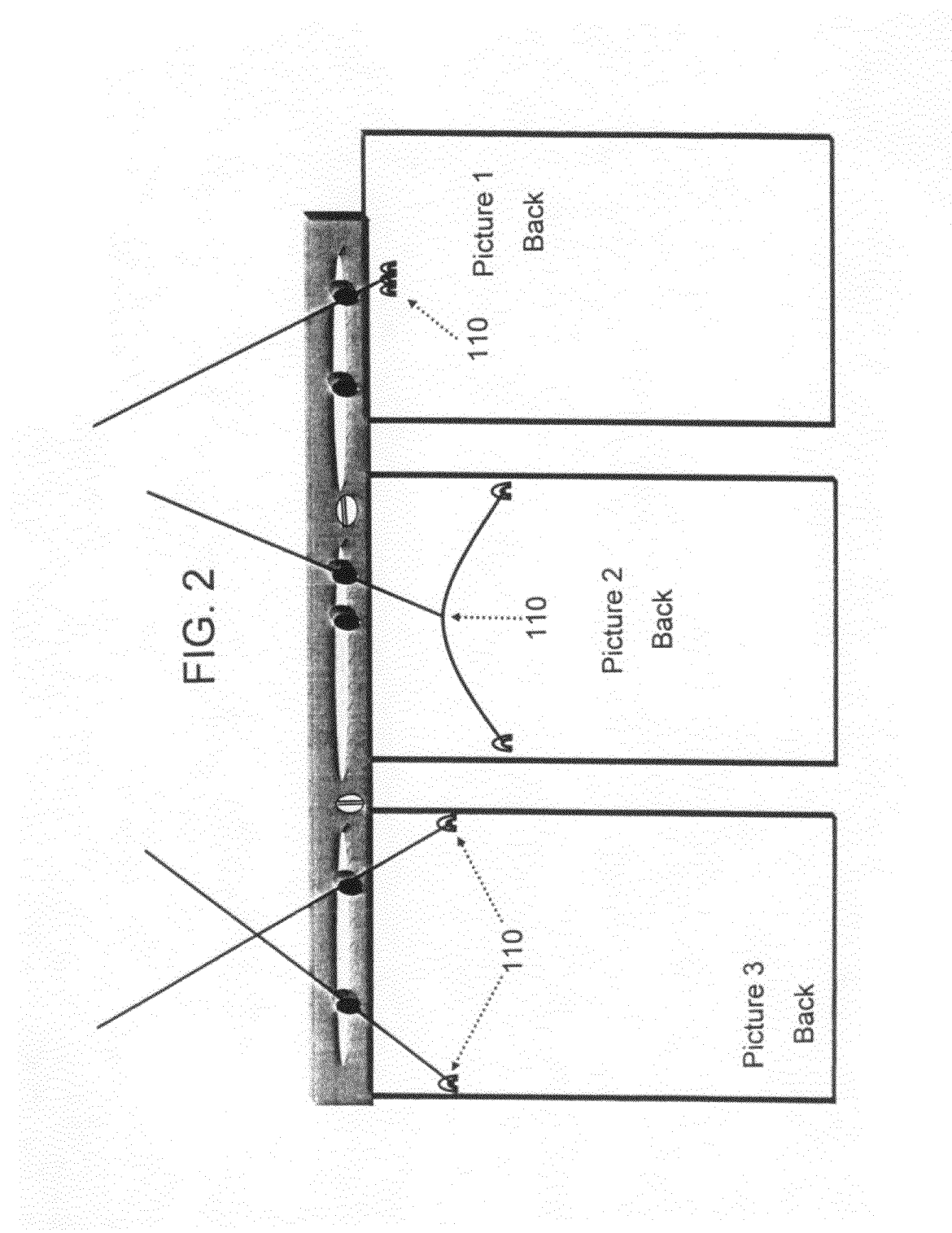
FIG. 2 illustrates how three pictures are positioned on the floor relative to the invention for purposes of establishing and setting the location of their respective fastener devices

FIG. 2 illustrates the use of one embodiment of the invention to assist in the hanging of three pictures containing an aggregate of four hanging elements, which embodiment utilizes four of the first extension portions each containing a second extension portion. Each of the three pictures is placed face down on a floor in the reverse order (or mirror image) from left to right in which they are desired to be hung on the wall. The invention is then placed on the floor at the top edge of the pictures such that the top edge of each picture abuts up against the straight bottom edge of the elongate frame component and with the desired spacing between each picture. In its preferred embodiment, a measurement scale is marked along the bottom edge of the elongate frame in order to allow the user to precisely space each of the pictures relative to the other pictures. Once the pictures are in their desired positions along the bottom edge of the elongate frame component, each of the first extension portions is moved along the elongate frame component to and affixed at a position thereon that is preferably approximately above one of the four hanging elements such that its second extension portion is within reach of such hanging element. Each first extension portion is then rotated such that its second extension portion, when extended, will intersect with the middle of the hanging element above which it has been positioned. Each second extension portion is then extended until its hook element just reaches the hanging element into which or, in the case of hanging element that is a picture hanging wire, over which it is to be inserted and its hook element is then inserted, as applicable, into or over the hanging element so that it engages such hanging element. In the case of a hanging element that is a picture hanging wire, after the hook element of the second extension portion is hooked over the picture hanging wire, the second extension portion is pulled back through the hole in the first extension portion until the picture hanging wire is taught. By means described below, each first extension portion and each second extension portion is then locked into position.

One of ordinary skill in the relevant art would recognize that different embodiments of the invention could comprise first extension portions and second extension portions that lock into position using locking mechanisms. One such embodiment would operate using only the application of friction. For example, physically extending or shortening by hand a second extension portion through the hole in the first extension portion, sliding the first extension portion by hand along the elongate frame component, and rotating the first extension portion by hand could require the user to apply a sufficient level of force the absence of which would render those components unlikely to inadvertently shift positions on their own. For example, the hole in a rubber first extension portion could be just the right diameter so as to allow a wire second extension portion to be easily extended out or retracted back by hand through such hole but would be unlikely to inadvertently move after being extended or retracted to its desired length. Similarly, the invention could be assembled such that a rubber first extension portion would be affixed tightly enough against the elongate frame such that it could easily be slid by hand back and forth along the elongate frame and rotated on its axis by hand but, upon being slid and rotated into its desired position, would be unlikely to inadvertently slide or rotate further after being set in its desired position. Or, one of ordinary skill in the relevant art would understand that various types of mechanical locking mechanisms, like standard screw tightening mechanisms, could be incorporated into the first extension and second extension portions to ensure that they retain their desired set positioning.

After each first extension portion and second extension portion has been locked into place, the hook element at the end of each second extension portion is then disengaged from the hanging element into or over which it has been inserted. In one embodiment, such release is accomplished by disengaging the hook elements by hand.

Figure 3:
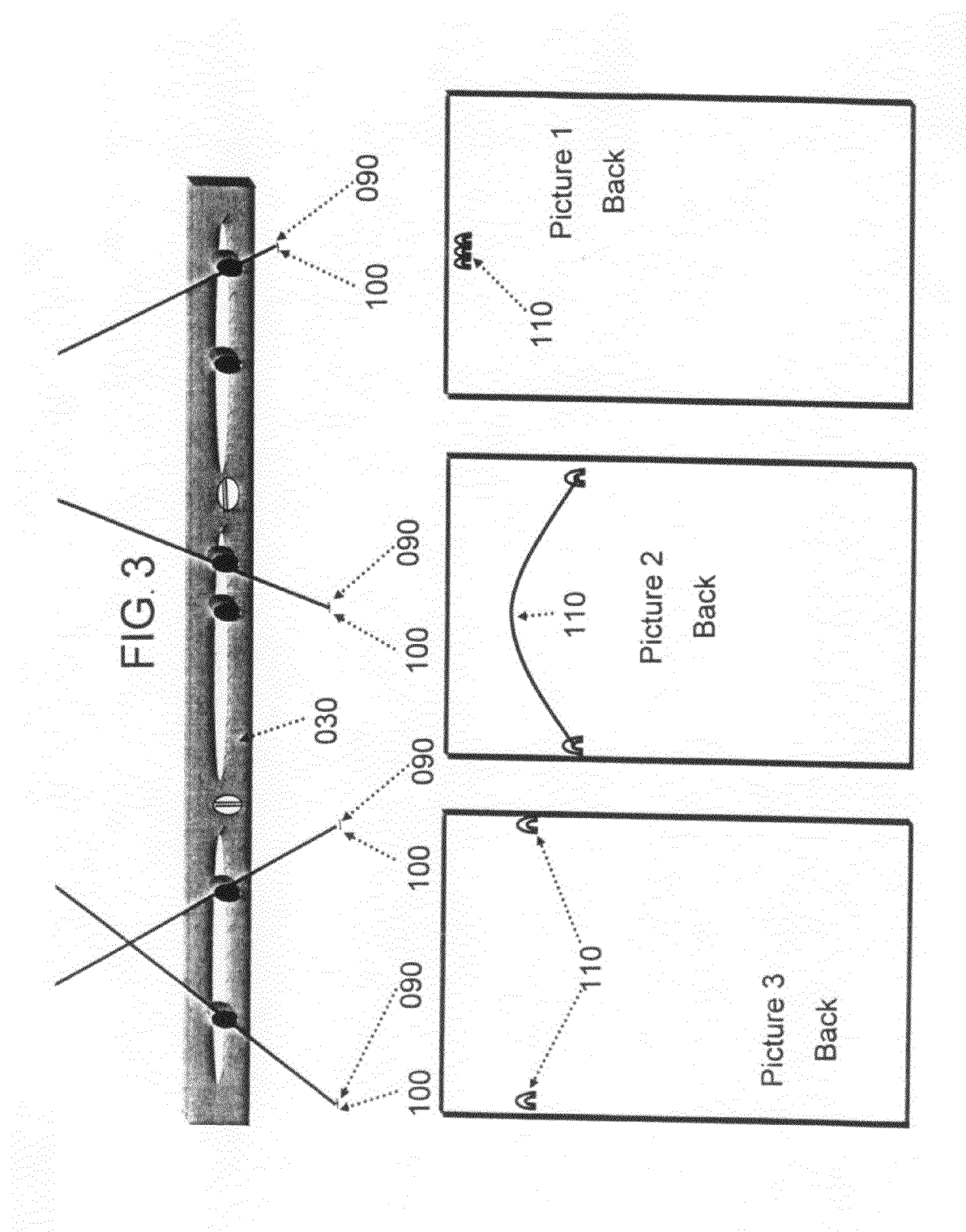
FIG. 3 illustrates how the invention appears immediately subsequent to lifting it from the floor after setting its components in order to mark the spots for installing the fastener devices that correspond to the hanging elements of the three pictures in FIG. 2.

With all first extension portions locked into their desired positions along the elongate frame and all second extension portions disengaged from the hanging elements and locked into their desired positions, the invention is then removed from the floor and pictures by hand. As illustrated in FIG. 3, the relative positioning of each hook element 090 and each marking element 100 to each other hook element and marking element remains identical to the relative positioning of each of the hanging elements 110 to each other.

Figure 4:
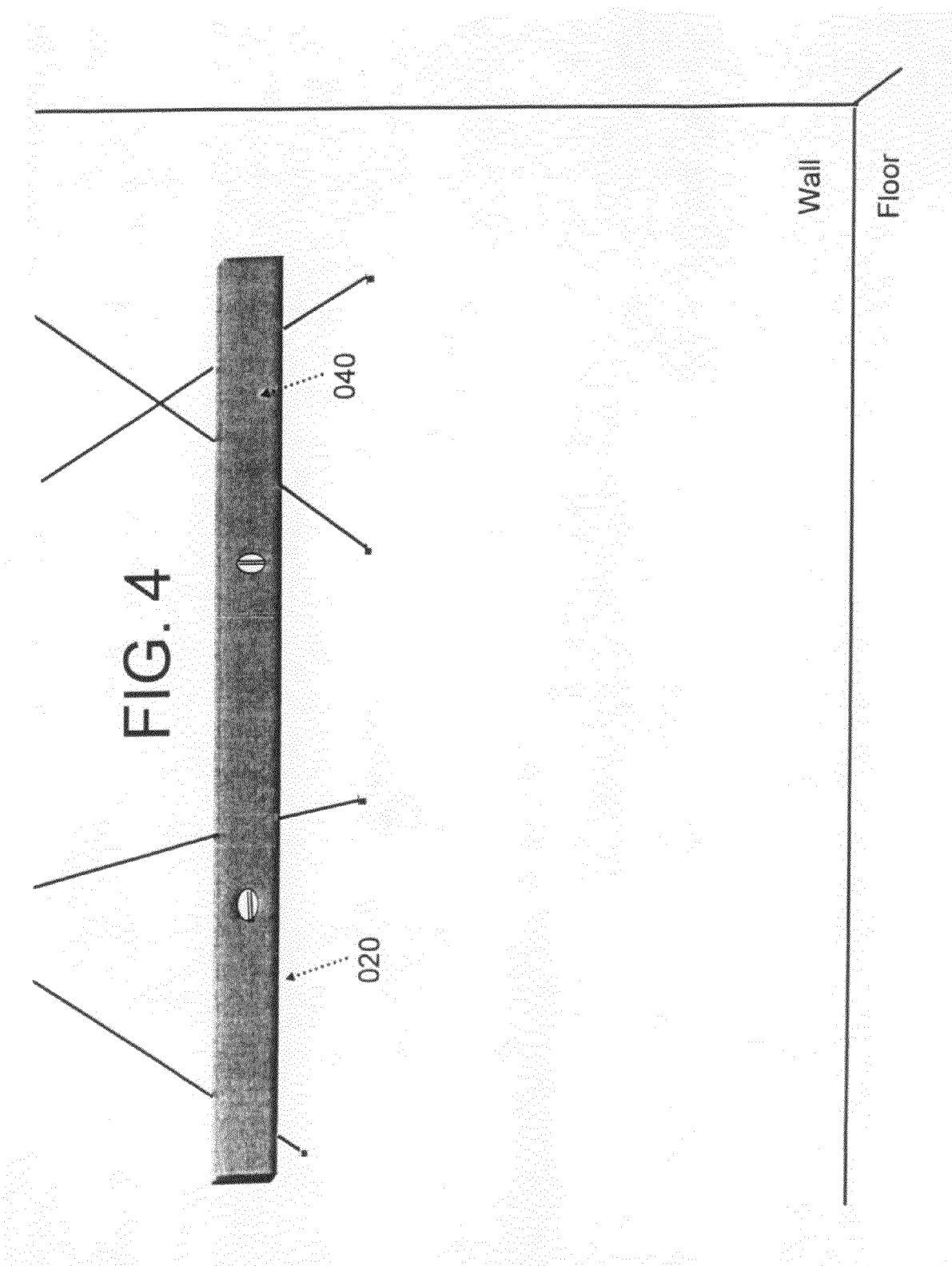
FIG. 4 is an illustration of the invention as configured in FIG. 3 after it has been flipped end-over-end and placed flat against the wall.

Once removed from the floor and pictures, the invention is held with the bottom edge of the elongate frame 020 facing the floor and then rotated one hundred eighty degrees end-over-end. The user then positions the invention against the wall on which the three pictures are to be hung with the rear face of the elongate frame 040 facing away, from the wall (as illustrated in FIG. 4) and the first extension portions providing a buffer between the elongate frame and the wall, and with the bottom edge of the elongate frame horizontally level against the wall on approximately the same horizontal line that the user desires for the top edge of the pictures that are to be hung.

With the invention now positioned against the wall at a location that will result in the pictures being hung in approximately the desired spots, the invention can then be moved, left or right and/or up and down, to that position that will allow the pictures to be hung at their desired locations on the wall and, using the bubble-level on the elongate frame component, adjusted on that the bottom edge of the elongate frame component is horizontally level against the wall. The marking element at the end of each second extension portion is then pressed against the wall thereby leaving a mark on the wall at the exact spot for installing a fastener device.

Figure 5:
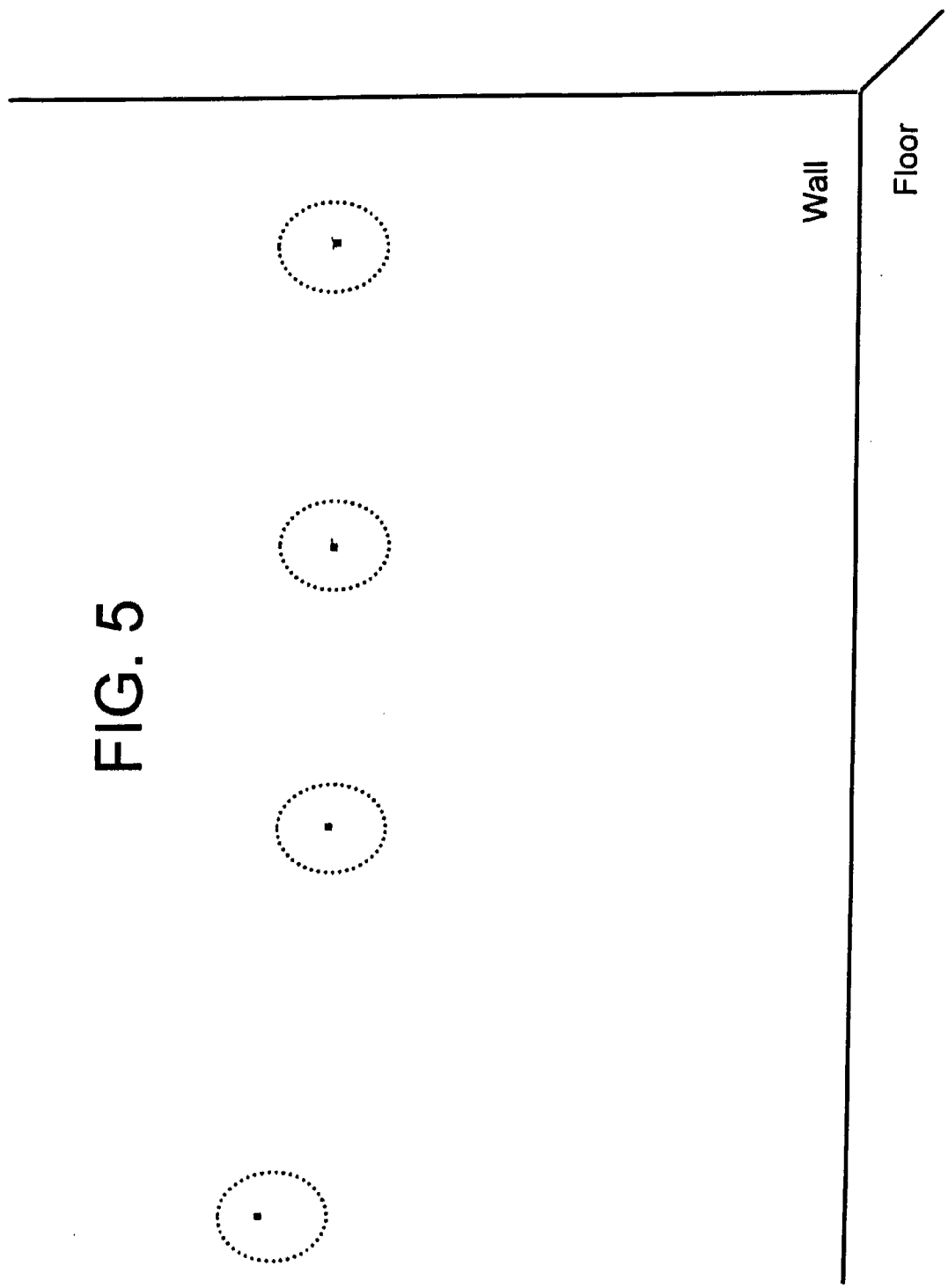
FIG. 5 shows the marks left on the wall by the marking elements at the end of the second extension portions illustrated in FIG. 4.
Figure 6:
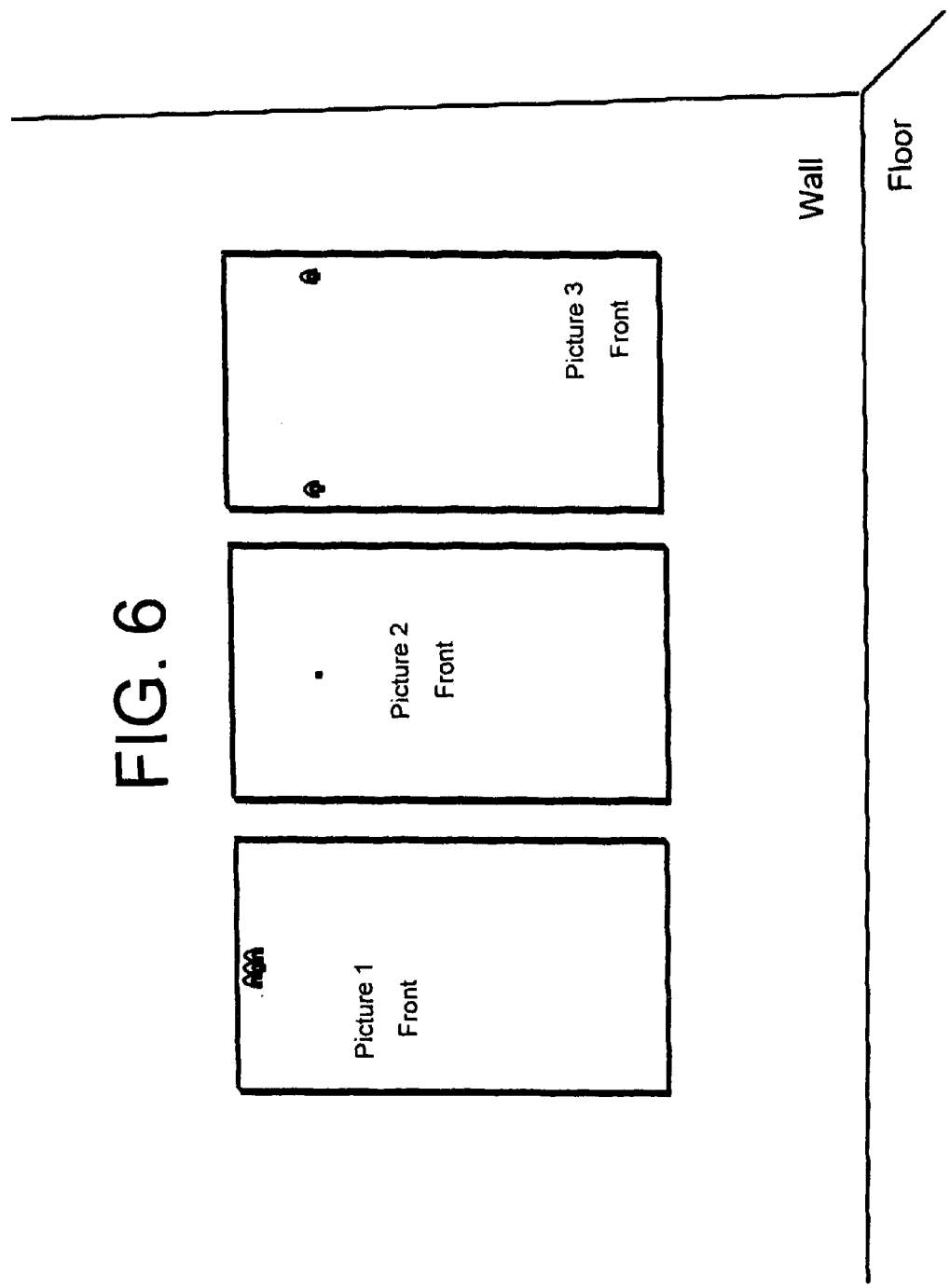
FIG. 6 is a drawing of the three pictures from FIG. 2 after they have been hung on hanging elements inserted into the wall at the locations of the marks illustrated in FIG. 5.

Having marked the locations for each fastener device by pressing the marking element of each second extension portion against the wall, the invention is then removed from the wall, leaving only the marks at which the fastener devices are to be installed (as illustrated in FIG. 5). The desired fastener devices are then installed on the wall at such marks, and the pictures are then hung by their respective hanging element or elements on the applicable fastener device or devices, resulting in the desired level hanging of the pictures (as illustrated in FIG. 6).

Figure 7:
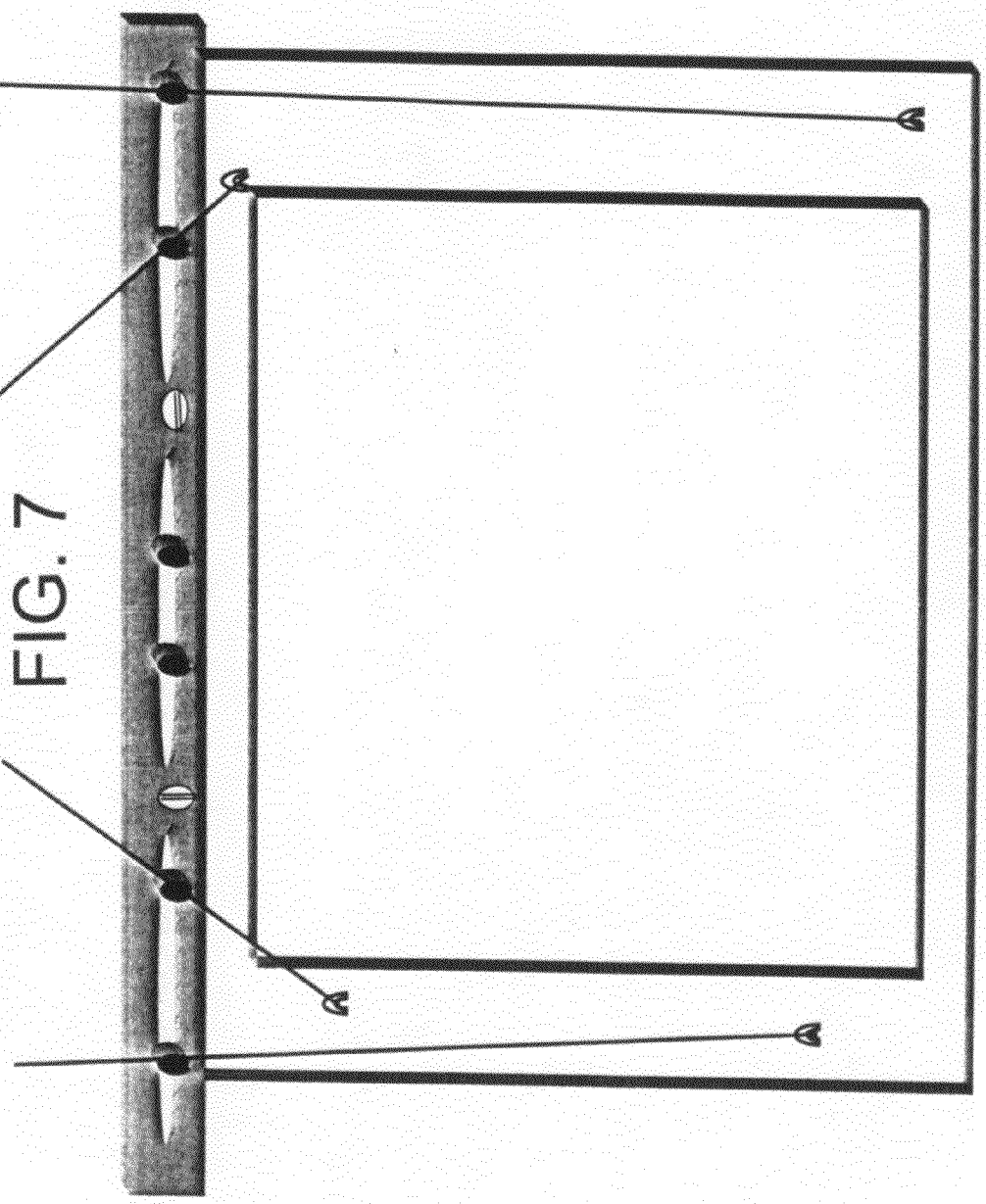
FIG. 7 illustrates how the invention might be used to facilitate the hanging of a larger, heavier object such as a mirror.

Occasionally the user of the invention may desire to hang an object, such as a large, heavy mirror, for which one or more second extension portions of a greater length is required in order for their hook elements to extend to and engage the hanging elements. FIG. 7 illustrates such an object that is of sufficient size or weight so as to have multiple and sometimes irregularly spaced hanging elements on its back. By replacing one or more, as necessary, of the second extension portions with a second extension portion of sufficient length, the hook element at the end of each second extension portion can be extended to and inserted into a hanging element on the back of the mirror and, as described above, locked into place and then disengaged. Also as described above, the invention can then be placed against the desired wall and leveled in the exact spot where the mirror is to be hung and the marking element on the end of each second extension portion can be pressed against the wall thereby marking the exact spot for installation of its corresponding fastener device.

Also occasionally, the user of the invention will desire to hang two or more objects at the exact same height but on adjoining walls. This can be easily accomplished with an embodiment of the invention wherein two of the inventions are joined together end-to-end by means of hinge or other connector, such that one of the elongate frames could be positioned against one wall and the other elongate frame could be positioned against the adjoining wall with the connector in the corner of the two adjoining walls. When opened to its full length and positioned flat on the floor, one or more pictures that the user desires to hang on one wall would be positioned against the bottom edge of one of the elongate frames and one or more pictures that the user desires to hang on the adjoining wall would be positioned against the bottom edge of the second elongate frame. Following the steps set forth above, the user would then position the first extension portions on both elongate frames, extend their respective second extension portions to, and insert the hook elements of the second extension portions into or over, the hanging elements on the back of the pictures, lock the first extension portions and second extension portions in place, disengage the hook elements from the hanging elements, rotate the joined elongate frames end-over-end and position them against the adjoining walls such that the hinge or other hinge-like connector rests in the corner of the adjoining walls, adjust the positioning of and level the elongate frames until they are in the desired position, and press the marking elements against the wall, thereby marking the exact location for installation of each of the fastener devices.

One of ordinary skill in the relevant art would recognize that different embodiments of the second extension portion of the invention could utilize a variety of marking elements. As illustrated in FIG. 1, one such marketing element 100 could be the wire itself, crimped in such a way as to form both the hook element and the marking element. This marking element would simply make a slight indentation in the wall at the point at which the fastener device is to be installed. Alternatively, the marking element may be a specially designed and attached pen or felt tip or other marker that would leave a spot on the wall at the point at which the fastener device is to be installed, and may be configured to activate only when pressed against the wall.

Figure 8:
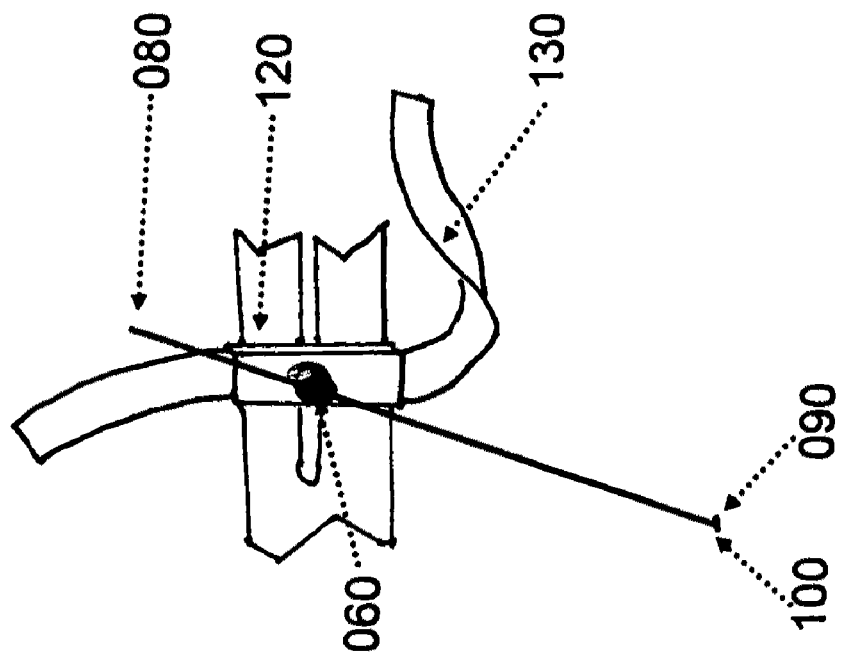
FIG. 8 is a drawing of one embodiment of the first extension portion and second extension portion forming a unit separate from and attachable to an elongate frame component.
Figure 9:
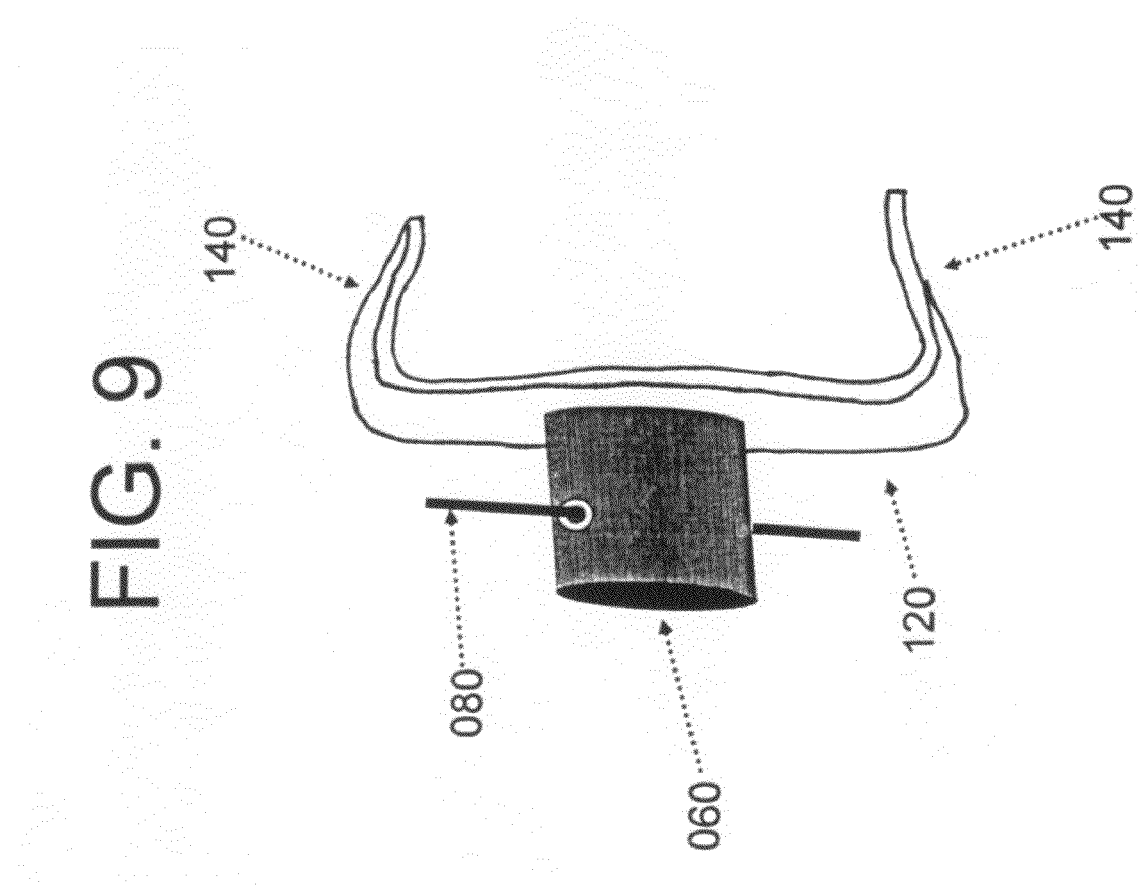
FIG. 9 shows side views of a first extension portion and second extension portion stand-alone unit attachable to an elongate frame unit by means of an adjustable strap and of a first extension portion and second extension portion stand-alone unit attachable to an elongate frame unit by means of a flexible clamp mechanism.

One of ordinary skill in the relevant on would further recognize that one embodiment of the invention could consist of a stand-alone first elongate frame component onto which one or more, depending upon how man) are needed in order to mark the fastener device locations for hanging the desired picture or pictures, stand-alone first extension portion and second extension portion units can be attached and detached by the user of the invention. As illustrated in FIG. 8, one such stand-alone first extension portion and second extension portion unit would be attachable to an elongate frame by means of a strap-like attachment element comprising a rigid middle section 120, to one surface of which a first extension portion 060 is attached and the other surface of which is positioned against the front face of an elongate frame 030, and straps on each end 130. FIG. 9 illustrates the side-view of such a stand-alone first extension portion and second extension portion unit that, instead of being attachable to an elongate frame component by means of a strap-like apparatus is attachable by means of a sturdy but flexible bracelet-like apparatus 140.

One of ordinary skill in the relevant art would further recognize that different embodiments of the invention could contain variations of the first extension portion and second extension portion components. In one such embodiment, the first extension portion is comprised of a housing element into or out of which a tape-measure like second extension portion can be retracted or extended, similar to a carpenter's mechanical tape measure, with the extended end being configured to contain a hook element and a marking element.

One of ordinary skill in the relevant art would further recognize that one embodiment of the donate frame component of the invention could be configured to include a measurement scale marked along the bottom edge of the elongate frame to assist the user in the positioning of pictures along the bottom edge of the elongate frame so that, when hung on the wall, they are at the desired distance from each other. In one such embodiment, the measurement scale would be imprinted or otherwise marked on the front face of the elongate frame along the top edge thereof.

One of ordinary skill in the relevant art would further recognize that a user of the invention could avoid making unintended marks or scratches on the wall by using an embodiment of the first extension portion component that either includes a cushioned surface or is made entirely of a non-scratch material such as rubber, plastic or cork.

I claim:

1. An apparatus for marking on a wall the position at which one or more fastener devices are to be installed for the hanging of one or more pictures or other objects, the marking apparatus comprising:
    an elongate frame that is comprised of a straight bottom edge, a rear face a front face and at least one bubble-level device;
    one or more first extension portions connected to and extending from the front face of the elongate frame; and
    one or more adjustable second extension portions connected to and extending from each first extension portion, wherein each such second extension portion is in a plane substantially parallel with the plane of the front face of the elongate frame, is extendable to varying lengths as measured from the first extension portion and has one end that is comprised of a hook element that extends away from the elongate frame and a marking element that extends towards the elongate frame,
    wherein the marking apparatus is configured to be placed rear face down on a floor or other horizontal surface with one or more pictures or other objects to be hung also positioned on the horizontal surface, face down and with their top edge abutted against the straight bottom edge of the elongate frame,
    wherein the positioning of the first extension portion can be adjusted to allow the hook element at the end of the second extension portion to be extended directly toward a hanging element on the back of the one or more objects to be hung,
    wherein the hook element of the one or more second extension portions is inserted into each hanging element on the back of the one or more objects to be hung,
    wherein the hook element of each second extension is disengaged from the hanging element into which it is inserted and the marking apparatus is picked up from the horizontal surface, rotated end-over-end and positioned against the wall with its front face towards the wall and the first extension portions against the wall, and
    wherein the marking element on each extended second extension is pressed against the wall leaving a mark on the wall at the spot where each of the one more fastener devices is to be installed.

2. The marking apparatus of claim 1, wherein the marking apparatus is further comprises a measurement scale marked along the bottom edge of the elongate frame to facilitate the positioning of the pictures.

3. The marking apparatus of claim wherein one elongate frame can be attached end-to-end to a second elongate frame to form a single, longer elongate frame.

4. The marking apparatus of claim 3, wherein the two elongate frames are attached in a hinged manner that enables one of the elongate frames to be placed against one wall and the other against an adjoining wall with the hinged connector positioned in the corner of the two adjoining walls.

5. The marking apparatus of claim 1, wherein the first extension portion is configured so as to rotatable on its axis.

6. The marking apparatus of claim 1, wherein the first extension portion is comprised of a cushioned material for protecting the wall and for maintaining the marking device in a stationary position when held against the wall.

7. The marking apparatus of claim 1, wherein one or more of the first extension portions is moveable along the front face of the elongate frame to positions along the elongate frame that are more nearly above the hanging elements on the pictures to be hung.

8. The marking apparatus of claim 1, wherein the first extension portion can be locked into its desired position along the elongate frame.

9. The marking apparatus of claim 1, wherein the second extension portion is a rigid metal wire.

10. The marking apparatus of claim 1, wherein the second extension portion can be locked into place once its hook element has been positioned at a hanging element on the back of the picture to be hung.

11. The marking apparatus of claim 1, wherein the marking element at the end of the second extension portion comprises a marker the tip of which is protected a casing and is configured to come into contact with the wall only when pressed against it.

12. The marking apparatus of claim 1, wherein the first extension portion is comprised of a housing element and the second extension portion is comprised of a tape-measure like second extension portion that extends from and is retractable into the housing element.

13. The marking apparatus of claim 1, wherein the first extension portion and second ex extension portion are together a tape measure-like device.

14. An apparatus for marking on a wall the position at which one or more fastener devices are to be installed for the hanging of one or more pictures or other objects, the marking apparatus comprising:
- one or more first extension portions connected to and extending from an attachment element that is attachable to an elongate frame that is comprised of a straight bottom edge, a rear face and a front face; and
- one or more adjustable second extension portions connected to and extending from each first extension portion, wherein each such second extension portion is in a plane substantially perpendicular to the first extension portion, is extendable to varying lengths as measured from the first extension portion and has one end that is comprised of a hook element that extends away from the attachment element and a marking element that extends towards the attachment element,
- wherein the elongate frame to which the one or more first extension portions is attachable is placed rear face down on a floor or other horizontal surface with one or more pictures or other objects to be hung also positioned on the horizontal surface, face down and with their top edge abutted against the straight bottom edge of the elongate frame,
- wherein the positioning of the first extension portion can be adjusted to allow the hook element at the end of the second extension portion to be extended directly toward a hanging element on the back of the one or more objects to be hung,
- wherein the hook element of the one or more second extension portions is inserted into each hanging element on the back of the one or more objects to be hung,
- wherein the hook element of each second extension is disengaged from the hanging element into which it is inserted and the marking apparatus is picked up from the horizontal surface, rotated end-over-end and positioned against the wall with its front face towards the wall and the first extension portions against the wall, and
- wherein the marking element on each extended second extension is pressed against the wall leaving a mark on the wall at the spot where each of the one more fastener devices is to be installed.

15. The marking apparatus of claim 14, wherein the elongate frame to which each marking apparatus is attachable is a spirit level, bubble level or other carpenter's level tool.

16. The marking apparatus of claim 14, wherein the attachment element that is attachable to an elongate frame is comprised of, and is attachable to the elongate frame by use of, an adjustable strap.

17. The marking apparatus of claim 14, wherein the attachment element that is attachable to an elongate frame is comprised of, and is attachable to the elongate frame by use of, a clamp or other bracelet-like element.

18. The marking apparatus of claim 17, wherein the clamp or other bracelet-like element comprises one of a flexible material that is configured to grip onto or around the elongate frame.

19. The marking apparatus of claim 18, wherein the flexible material is one of plastic, fiberglass or metal.

20. The marking apparatus of claim 14, wherein the first extension portion is configured so as to rotatable on its axis.

21. The marking apparatus of claim 14, wherein the first extension portion is comprised of a cushioned material for protecting the wall and for maintaining the marking device in a stationary position when attached to an elongate frame and held against the wall.

22. The marking apparatus of claim 14, wherein the second extension portion is a rigid metal wire.

23. The marking apparatus of claim 14, wherein the second extension portion can be locked into place once its hook element has been positioned at a hanging element on the back of the picture to be hung.

24. The marking apparatus of claim 14, wherein the marking element at the end of the second extension portion comprises a marker the tip of which is protected by a casing and is configured to come into contact with the wall only when pressed against it.

25. The marking apparatus of claim 14, wherein the first extension portion is comprised of a housing element and the second extension portion is comprised of a tape-measure like second extension portion that extends from and is retractable into the housing element.

26. The marking apparatus of claim 14, wherein the first extension portion and second extension portion are together a tape measure-like device.

* * * * *